United States Patent [19]

Shenoy et al.

[11] Patent Number: 5,168,563
[45] Date of Patent: Dec. 1, 1992

[54] VARIOUS POSSIBLE EXECUTION PATHS MEASUREMENT AND ANALYSIS SYSTEM FOR EVALUATING BEFORE WRITING SOURCE CODES THE EFFICIENCY PERFORMANCE OF SOFTWARE DESIGNS

[75] Inventors: Anil K. Shenoy, Los Altos; Vincent D'Angelo, Los Gatos; Walter J. Utz, Jr., San Jose, all of Calif.

[73] Assignee: Hewlett-Packard Company, Palo Alto, Calif.

[21] Appl. No.: 859,290

[22] Filed: Mar. 25, 1992

Related U.S. Application Data

[63] Continuation of Ser. No. 331,315, Mar. 29, 1989, abandoned.

[51] Int. Cl.[5] ...................... G06F 15/60; G06F 15/20
[52] U.S. Cl. .................................. 395/500; 395/575; 395/800; 364/488; 364/578; 364/275.6; 364/DIG. 1
[58] Field of Search ... 364/200 MS File, 900 MS File, 364/488, 578; 371/19; 395/575, 800, 500

[56] References Cited

U.S. PATENT DOCUMENTS

| | | | |
|---|---|---|---|
| 3,702,005 | 10/1972 | Ingalls, Jr. ............................ | 395/575 |
| 4,742,467 | 5/1988 | Messerich et al. ................... | 364/200 |
| 4,782,461 | 11/1988 | Mick et al. ........................... | 364/900 |
| 4,809,170 | 2/1989 | Leblang et al. ...................... | 364/200 |
| 4,845,665 | 7/1989 | Heath et al. ......................... | 364/900 |
| 4,864,569 | 9/1989 | DeLucia et al. ..................... | 371/19 |

OTHER PUBLICATIONS

Stucki; "A Case for Software Testing"; IEEE Transactions on Software Engineering, vol. SE-2, No. 3, Sep. 1976 p. 194.
Hakozaki et al., "Design and Evaluation System for Computer Architecture"; AFIPS Conference Proceeding; vol. 42, pp. 81-86, 1973.
Nejmeh; "NPath: A measure of Execution Path Complexity and its Applications"; Communications of ACM; Feb. 1988; vol. 31, No. 2; pp. 188-200.
K. Soule; "Algorith for Tracing Execution Paths to a Given Location in a Program"; IBM Technical Disclosure Bulletin; vol. 14 No. 4; Sep. 1971; pp. 1016-1019.
Antoine et al.; "Effective Software Debugging Using a Program Trace"; Electrical Communication; vol. 54, No. 2, 1979; pp. 111-114.
Feingold; "Computer System Simulation: A Design Evaluation Tool"; Winter Simulation Conference; Dec. 6-8, 1976; pp. 293-308.
Merle et al.; "A Tool for the Aided Design and Evaluation of Computer Architectures"; IEEE 1978; pp. 128-135.
Yang et al., "Critical Path Analysis for the Execution of Parallel and Distributed Program"; Conference location San Jose, Calif., date 13-17 Jun. 1988; pp. 366-373.
Proceedings of the Eight Annual International Phoenix Conference on Computers and Communications, Mar. 24, 1989, Scottsdale, Ariz., pp. 332-336 Jianping Wang et al.: "Software Performance Analysis Using a Graphic Modeling Technique".
Hewlett-Packard Journal, No. 4, Aug. 1988, Palo Alto, Calif. USA, pp. 71-82, James P. Ambras et al., "Microscope: An Integrated Program Analysis Toolset".
Proceedings of the 10th International Conference on Software Engineering, Apr. 15, 1988, Singapore, pp. 388-395, James L. Benjamin, "Pilot: A Prescription for Program Performance Measurement".

*Primary Examiner*—Lawrence E. Anderson
*Assistant Examiner*—Krisna Lim

[57] ABSTRACT

A software engineering tool is disclosed which enables the efficiency and performance of a program design to be evaluated prior to the time the program is written into code. Every possible path that can be followed in the implementation of the program is identified, and its length is measured. From this information, reports are generated which point out the longest paths in the program and sources of potential performance problems. In addition, weights which identify relative complexities or performance timings can be assigned to individual modules in the program, and form the basis of other reports which indicate timing performance. The user is provided with the opportunity to alter the weights assigned to modules, and thereby determine the effect which different weights have on the overall performance of the program.

6 Claims, 6 Drawing Sheets

VARIOUS POSSIBLE EXECUTION PATHS MEASUREMENT AND ANALYSIS SYSTEM FOR EVALUATING BEFORE WRITING SOURCE CODES THE EFFICIENCY PERFORMANCE OF SOFTWARE DESIGNS

CROSS REFERENCE TO RELATED APPLICATION

This is a continuation of copending application Ser. No. 07/331,315 filed on Mar. 29, 1989, now abandoned.

BACKGROUND OF THE INVENTION

The present invention generally relates to the development of software programs, and is more specifically directed to a novel programming tool which enables a software engineer to evaluate the expected performance of a program and isolate potential performance problems during an early stage of program development.

A typical life cycle in the development of a computer program includes the initial steps of analyzing the problem to be solved by the program and designing the overall structure of the program. After the general structure of the program has been designed, it is then constructed, or coded, after which it undergoes a period of testing and debugging. Finally, after the program has been successfully tested, it is released for general use. One difficulty associated with this traditional approach to the development of software is the fact that it does not readily enable design defects to be recognized until substantially all of the work necessary to create the program has been completed. In other words, in the past it has always been necessary to construct the code for the program before it could be tested for the efficiency of its operation. Thus, once the code had been written and the program run during the testing phase, if unsatisfactory performance was detected it was necessary to return to the design phase to restructure the program, and then rewrite the code to implement the design changes.

Often, the types of mistakes which are most expensive to correct are those which occur in the analysis and design phases of the software development cycle. In this regard, one of the factors which significantly influences the performance of a program is the lengths of the paths in the structure of the program that are followed to carry out a particular task. The length of the path is typically defined in terms of the number of transitions from module to module which occur as the program proceeds from an initial module to the final node in the path which represents completion of the task. As a path length becomes longer, it typically takes the program longer to execute the task, thereby reducing the efficiency of the program. Another factor which influences the performance of the program is the efficiency of a particular module which may be executed often by being called many times.

In this regard, one popular methodology that is used in the development of software is known as Structured Design. Basically, this methodology involves breaking a task down into smaller and smaller functional units. Through this approach, repeatable and more predictable results can be obtained in software development. However, since the structured design approach promotes functional decomposition and small module sizes, it can result in longer path lengths. As a result, the performance of the program could be less than optimal when this design methodology is employed.

Unfortunately, since long paths are often difficult to manually identify, particularly in large and complex programs, the program must be coded and tested before long path lengths which affect its performance can be recognized. As a result, it can be appreciated that significant and expensive efforts may be required to redesign the program and then recode it once the performance limitations have been detected. Accordingly, it would be desirable to provide a software engineering tool which isolates possible performance problems early in the software development cycle, before coding, to thereby minimize the effort necessary to correct such problems.

BRIEF STATEMENT OF THE INVENTION

In accordance with the present invention, a software engineering tool is provided which enables the expected efficiency and performance of a program design to be evaluated prior to coding. It is particularly designed to work with the results of the Structured Design approach to software development. Basically, conventional software tools that are used in the implementation of the Structured Design approach provide a database which includes a specification for each module (functional element) in the design, as well as the overall relationship of the modules to one another. Utilizing this information, the performance evaluation tool of the present invention determines every possible path that can be followed in the implementation of the program. From these determinations, reports are generated which identify the longest paths in the program, and hence the sources of potential "bottlenecks" in the performance of the program.

In addition, the relative time that would be required to follow each path can be determined on the basis of weighting factors assigned to the various modules. As another feature of the invention, the modules which are called most often in the implementation of the program can be identified and called to the program developer's attention as program elements which may need to be most closely reviewed for possible optimization. As a further feature, the performance evaluation tool can enable the user to create various hypothetical situations and evaluate their effect on the efficiency of the program.

By means of the design evaluation tool, the present invention enables the program developer to identify and correct some types of design deficiencies before any coding of the program ever takes place, thereby significantly reducing the cost and effort required to produce a program which operates with optimum efficiency.

Further features of the present invention and the advantages offered thereby are explained in greater detail hereinafter with reference to various examples illustrated in the accompanying drawings.

DESCRIPTION OF THE ILLUSTRATED EMBODIMENTS

Figure 1:
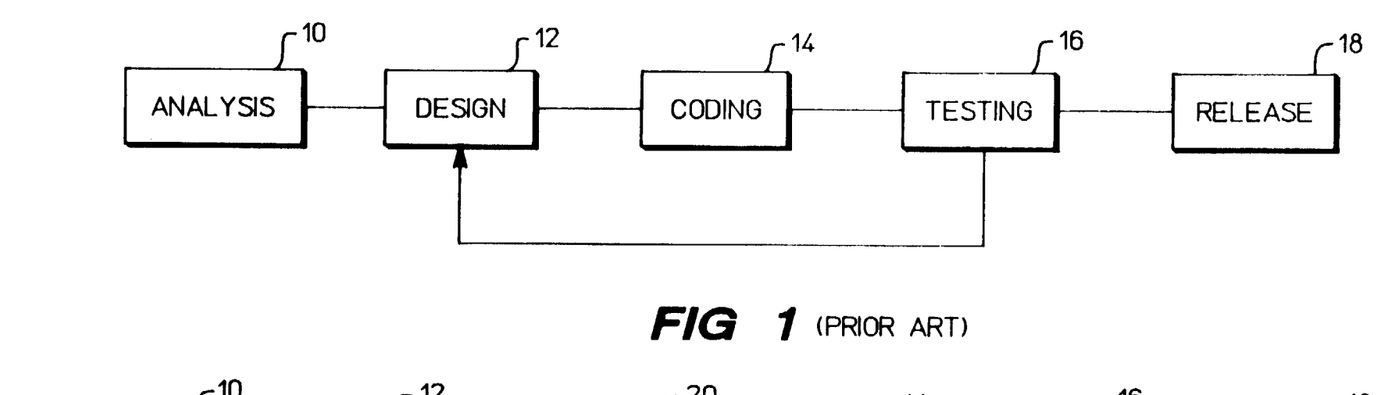
FIG. 1 is a block diagram flow chart of the prior art approach to the development of software.

The typical life cycle that has been conventionally employed in the development of software will first be briefly described with reference to FIG. 1. In a structured systems design approach, the first step involves a Structured Analysis 10 of the basic objectives of the software. Generally, this phase results in an outline of the program user's requirements for the program. Once these requirements have been identified, a Structured Design approach 12 is employed to define the tasks to be carried out by the software. When these tasks have been designed with sufficient particularity, actual coding of the program takes place, at step 14. After the coding phase, the program undergoes a testing and evaluation phase 16.

As a result of the testing phase, limitations in the performance of the program will be recognized. For example, tasks which are not completed in a specified period of time will be identified. At this point, the software development process returns to the design phase 12, where the design is revised to reduce or eliminate the performance bottlenecks. As a result of these design changes, additional coding 14 must take place, which is followed up by further testing and evaluation steps 16. The closed loop process of designing, coding, and testing might go through several iterations before the program finally operates at a satisfactory level. Once this point has been reached, the program is then released for distribution at step 18.

Figure 2:
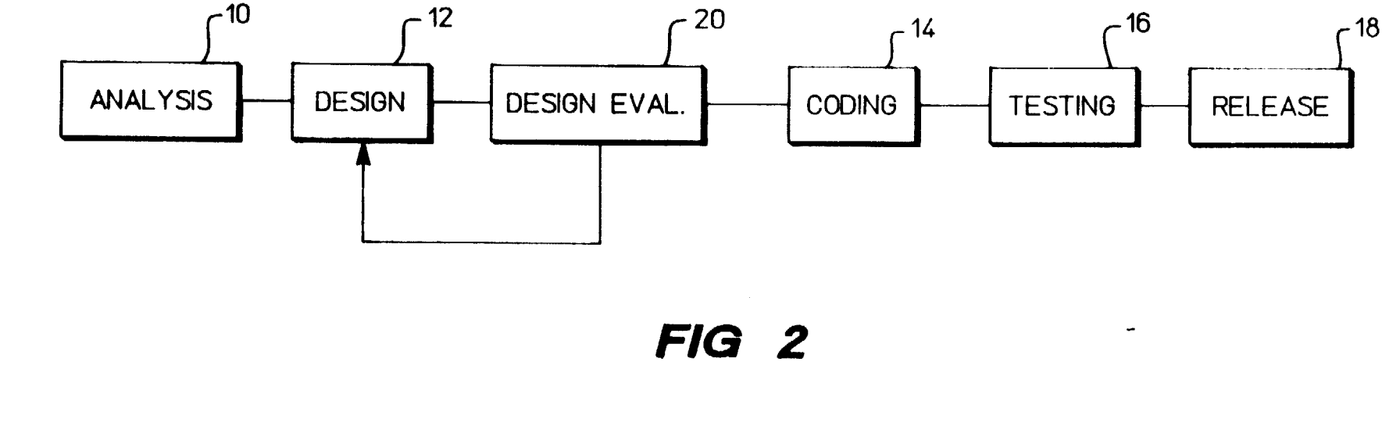
FIG. 2 is a block diagram flow chart depicting a software development life cycle which employs the principles of the present invention.

In accordance with the present invention, much of the time that is spent during the testing, redesign and recoding phases of the software development cycle can be significantly reduced by evaluating the efficiency of the design prior to the time that coding of the program takes place. Referring to FIG. 2, a software development cycle that employs the techniques of the present invention begins with an analysis of the functions to be performed by the program, preferably using the Structured Analysis approach. This phase is followed by the design phase 12 for the program, again preferably using a Structured Design technique. The software tools that are employed in accordance with this technique generate a database containing information that can be used to evaluate the overall efficiency of the design, in accordance with the present invention. Structured Design is a well known method that is conventionally employed by software engineers, and therefore will not be described herein. For a detailed description of this design approach, reference is made to *The Practical Guide to Structured Systems Design* by Meilir Page-Jones, published by Yourdon Press, New York, 1980.

Using the information provided as a result of the Structured Design, an evaluation 20 of the design takes place immediately following the completion of the design step 12, and prior to the coding phase 14. As a result of this evaluation, various inefficiencies in the design can be detected and called to the software engineer's attention. For example, as discussed previously, one factor which significantly contributes to the efficiency of a program is the lengths of the paths that must be followed to execute a particular task. The evaluation step 20 can determine the lengths of the paths that must be followed during the operation of the program under development. In addition, the evaluation phase 20 can operate to identify modules (functional elements) in the program which are utilized most frequently and call these modules to the designer's attention as likely candidates for optimization, as well as provide other information which helps to isolate possible performance limitations.

With the information provided from the design evaluation step 20, the software engineer can redesign the program to reduce or eliminate the possible inefficiencies. After the program has been redesigned, it can again be evaluated in accordance with the present invention, and further refined as necessary. Once the design evaluation step 20 provides an indication that the program structure meets a satisfactory performance level, the design can be presented to a programmer for the conventional steps of coding 14 and testing 16. Since the design evaluation helps to identify and reduce design inefficiencies prior to coding, the testing phase 16 is more likely to be concentrated on specific coding errors and the debugging of these errors. Coding errors are much easier and less expensive to correct than design mistakes, and hence the overall effort and time required to put the program in form for final release 18 could be significantly reduced, particularly for large and highly complex programs.

Figure 3:
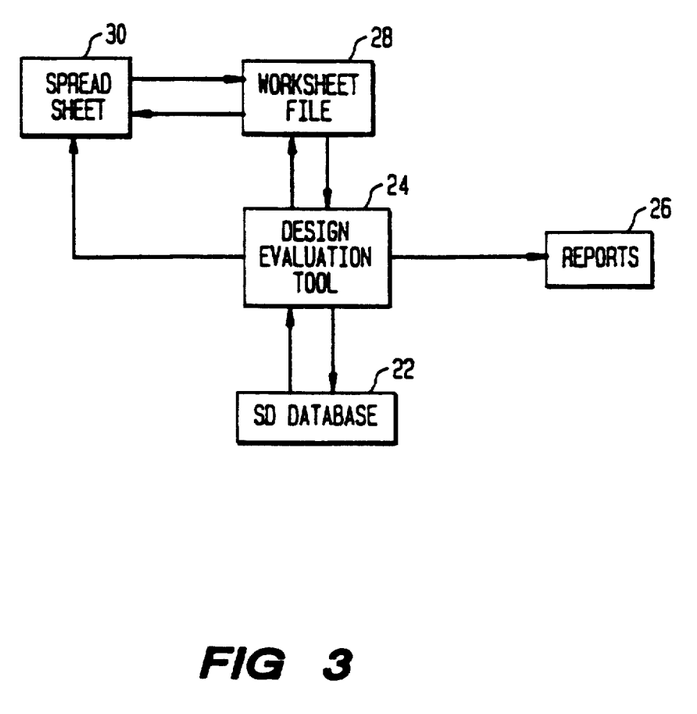
FIG. 3 is a general block diagram depicting the functional operation of the present invention.
Figure 4:
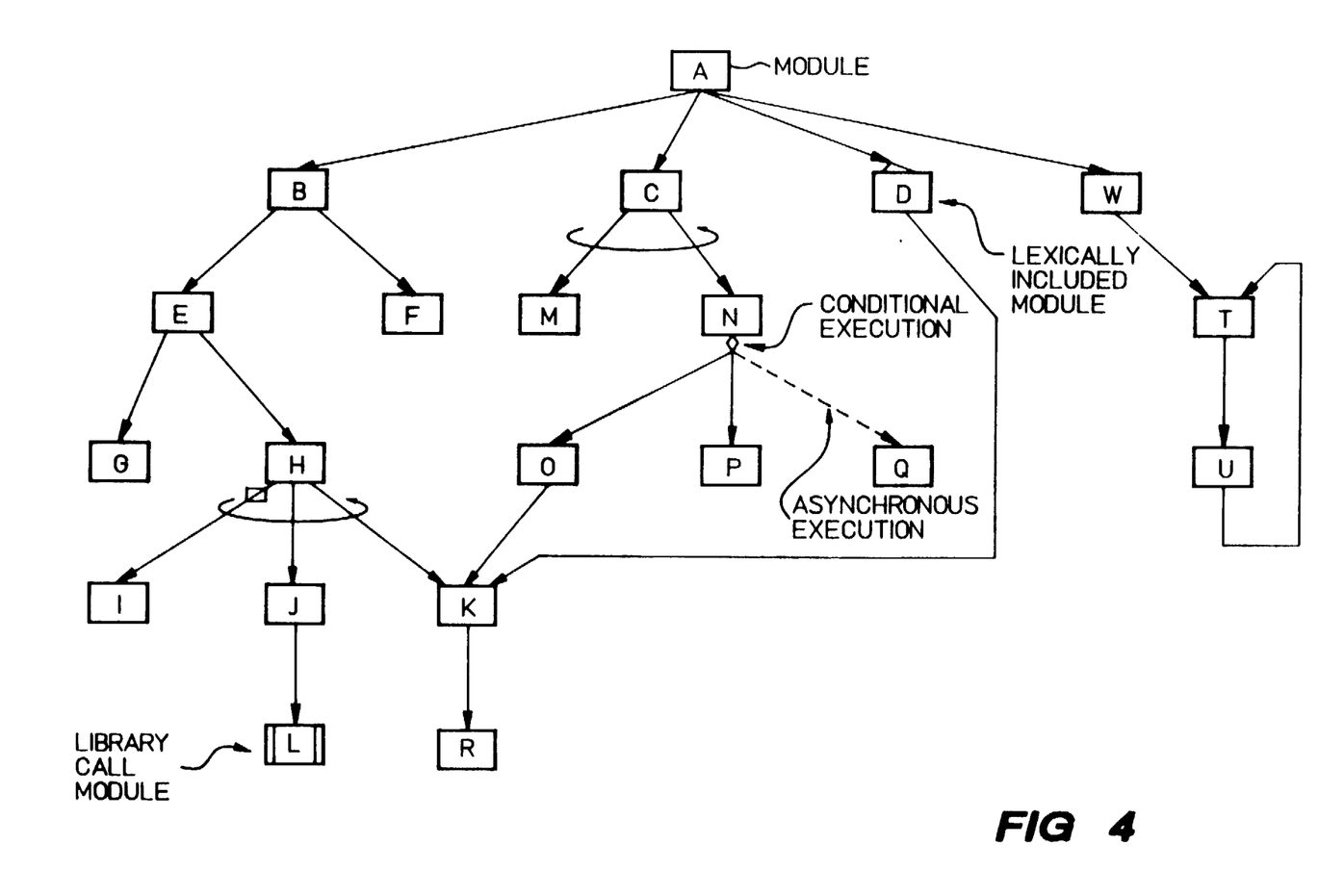
FIG. 4 is an example of a structure chart that can be produced through the Structured Design approach to software development.

The general architecture of a system for performing the design evaluation phase 20 is illustrated in block diagram form in FIG. 3. Referring thereto, the tools which are employed to carry out the Structured Design approach to software engineering provide a database 22 which contains information describing the overall structure of the program as well as the functionality of its individual modules. The overall structure of the program is typically represented by means of a structure chart, an example of which is shown in FIG. 4. The particular example represented in FIG. 4 is for a relatively simple program, to facilitate an understanding of the invention and its application. It will be appreciated, however, that the present invention is particularly useful in connection with large and highly complex program designs, whose structure charts may typically be spread over a number of sheets and are therefore difficult to manually comprehend.

In the structure chart, each of the blocks which is labeled with a letter represents a module in the program. The lines interconnecting the modules identify the hierarchical relationships of the modules to one another, and serve to define the paths which are followed in the operation of the program to perform specific tasks. In addition to information describing the structure chart, the database 22 (shown in FIG. 3) also contains a specification for each individual module. This specification basically describes the inputs of a module, the function performed within the module, and the outputs of the module.

The information contained within the database 22 is accessed by a design evaluation tool 24 which operates in accordance with the present invention. In one mode of operation, the evaluation tool 24 determines the length of every possible path that can be followed during the running of the program. Basically, a path length is defined in terms of the number of transitions from an initial module to the final node in the path. Referring to the structure chart shown in FIG. 4, the path from the initial module A to the terminal module M contains two transitions, from module A to C and then from module C to M. Thus, this path has a length of 2.

In operation, the user specifies a particular module of interest, which can be the begining module in a task execution path. Each possible path that can be followed from this initial module is then determined, and its length is measured. After all possible paths have been evaluated, the tool 24 generates reports 26 on a printer or a video display that are indicative of such evaluation. One such report can list all possible paths from the specified module, such as the root module A for example, and their corresponding lengths. For the program of FIG. 4, such a report would appear as follows in Table 1:

TABLE 1

| ALL PATHS | |
|---|---|
| Path | Path Length |
| A/B/E/G | 3 |
| A/B/E/H/I | 4 |
| A/B/E/H/J/L | 5 |
| A/B/E/H/K/R | 5 |
| A/B/F | 2 |
| A/C/M | 2 |
| A/C/N/O/K/R | 5 |
| A/C/N/P | 3 |
| A/C/N/Q | 3 |
| A D/K/R | 2 |
| A/W/T/U/T/ ... | * |

If desired, the paths can be listed in order of descending path length. In addition, the user can select whether those modules that are asynchronously activated, such as the module Q in the example of FIG. 4 (as represented by the dashed line from module N to module Q), are to be ignored during the design evaluation. In such a case, the paths to those modules (path A/C/N/Q in the example of FIG. 4 is such a path) would not be listed in the report shown in Table 1.

The report can also identify paths that are recursive, that is, those which could result in endless loops. The last path listed in Table 1 is a recursive path because it extends from module T to module U and then loops from module U back to module T. This path is identified as a recursive path by repetition of the letter which identifies the first module in the recursive path, ellipses in the path listing, and an asterisk rather than a finite number in the "Path Length" column of the table.

As another feature the report allows for any lexically included modules which are included in the structure chart. A lexically included module is actually a part of another module and therefore does not contribute to path length; however, it is convenient to illustrate it in the structure chart. In FIG. 4, for example, the module D is a lexically included module which is actually a part of the module A. This is denoted in FIG. 4 by a stylized carat on top of module D. Only one path includes module D—this path extends from module A to D, from module D to K (S) and from module K to R. This path, which is the next-to-last path in Table 1, is shown as having a path length of 2 because the lexically included module D does not contribute to the path length; this is indicated in Table 1 by a carat between the letters A and D in the path description.

Another type of report can list all excessive paths and path lengths. In the generation of this report, the software engineer specifies a length limit that should not be exceeded in the design, and the report would list only those paths that have a length greater than that which is specified. For example, if the software engineer specified a maximum path length of 4 for the program illustrated in FIG. 4, the excessive path length report would be constituted as shown in the following Table 2:

TABLE 2

| EXCESSIVE PATHS | |
|---|---|
| Path | Path Length |
| A/B/E/H/J/L | 5 |
| A/B/E/H/K/R | 5 |
| A/C/N/O/K/R | 5 |

A third type of report can identify portions of the design and program that the engineer may wish to optimize. In the generation of this report, the user specifies a number which indicates the unique number of calls to any module or sub-path. The purpose of this number is to identify the modules and sub-paths that are called most frequently by other modules. For example, if the user specifies the number 3, the design evaluation tool 24 generates a report identifying all sub-paths that have at least 3 unique calling modules. For the example shown in FIG. 4, such a report would appear as shown in the following Table 3:

TABLE 3

| OPTIMIZATION | | |
|---|---|---|
| Path | # Calls | Calling Modules |
| K/R | 3 | H,O,D |

In addition to reports which are based upon the lengths of paths in the structured design, the evaluation tool 24 can also provide reports which are based upon the anticipated time that would be required to complete certain tasks. In this mode of operation, the user assigns a relative weight to each module in the program structure. The weight assigned to a module is a number which represents, for example, the relative complexity of the module or the anticipated performance time of the module. These weights can be entered during the design phase 12 of the program and stored in the Structured Design database 22 as part of the module specification. Alternatively, the weights can be entered by the user during the design evaluation phase 20 and stored in a worksheet file 28, for example.

The tool 24 will read the weights from the worksheet file and update the module specifications in the design database 22 automatically. A weight of 1, for example, can be associated with a relatively simple module, and each other module can be assigned a weight value which indicates the complexity of that module relative to that of the simple module. Thus, a module with a weight of 3 would be expected to take 3 times longer to execute than the simple module having a weight of 1. If the user fails to specify a weight for a given module, the tool 24 can assign a default weight (for example, a weight of 1) to such module.

In this mode of operation, a timing report can be generated which identifies each path with its timing weight. The timing weight for a path would be the sum of the weights for each module in the path. As a subset of this report, the user can request that only those paths having a timing weight greater than a specified threshold level be identified.

As an alternative to designating specific weights for each module, the software engineer can identify each module as being of a particular type and store this identification as part of the module specification in the structured design database 22. The user can also provide a file which contains a list of module types and a performance weight for each type. The evaluation tool 24 can then refer to this file and assign the appropriate performance weight to a module based upon its type.

In addition to weighting each of the individual modules, a probability can also be assigned to each invocation path that is conditionally activated (not always called). In the example illustrated in FIG. 4, the paths from the module n to each of the modules o, p and q are conditional. This status is indicated by the diamond symbol at the output of the module n. For each of these conditions paths, a probability of its likelihood of being called can be assigned by the user. When generating a report on the paths that are most commonly called, the weighting information can be factored into the expected performance of the program.

A particularly useful report that can be generated with the design evaluation tool of the present invention is a performance report which identifies paths that should be of particular concern to the software engineer from the standpoint of possible performance problems. This type of report takes into account both path lengths and path weights and is comprised of three sections as shown in Table 4 below:

TABLE 4

| DESCENDING PATH LENGTHS | | | |
|---|---|---|---|
| Path | Length | Loops | Conds |
| A/B/E/H/J/L | 5 | 2 | 2 |
| A/B/E/H/K/R | 5 | 2 | 1 |
| A/C/N/O/K/R | 5 | 1 | 1 |
| A/B/E/H/I | 4 | 2 | 1 |

| DESCENDING PATH WEIGHTS | | | |
|---|---|---|---|
| Path | Weight | Loops | Conds |
| A/B/E/H/K/R | 11.00 | 2 | 1 |
| A/B/E/H/I | 8.50 | 2 | 1 |
| A/B/E/H/J/L | 6.15 | 2 | 2 |
| A/C/N/O/K/R | 5.85 | 1 | 2 |

| DESCENDING PATH LENGTHS & WEIGHTS | | | | |
|---|---|---|---|---|
| Path | Length | Weight | Loops | Conds |
| A/B/E/H/K/R | 5 | 11.00 | 2 | 1 |
| A/B/E/H/J/L | 5 | 6.15 | 2 | 2 |
| A/B/E/H/I | 4 | 8.50 | 2 | 1 |
| A/C/N/O/J/R | 5 | 5.85 | 1 | 2 |

In the generation of this report the user specifies how many paths are to be listed. This quantity is preferably expressed as a percentage of all the paths in the program. For example, if there are 40 paths in a program and a user specifies that 10% of the paths are to be listed, the report will list 4 paths.

The first section of the report lists those paths which have the greatest lengths, in order of decreasing length, until the desired number of paths have been listed. It also lists the number of loops and conditionals for each path, and sorts paths of the same length in descending order of loops and conditionals, respectively.

The second section lists those paths which have the greatest weights, in order of decreasing path weight, until the desired number of paths have been listed. Again, the number of loops and conditionals can be used as secondary and tertiary sorting criteria if two or more paths have the same weight.

The third section represents a combination of the first two sections; both length and weight are listed. The sorting of the paths in this section is done in accordance with criteria selected by the software engineer. In Table 4, the paths which are listed in the third section have been listed in ascending order of the sums of their ordinal positions in the first two sections.

The ordinal position of the path A/B/E/H/K/R in the first section, for example, is 2 and in the second section is 1; its ordinal sum is therefore 3. Similarly, the ordinal position of the path A/B/E/H/J/L in the first section is 1 and in the second section is 3; its ordinal sum is therefore 4 and accordingly it is listed below the path A/B/E/H/K/R in the third section of the table.

If desired, the user can decide whether paths that contain external library calls, such as the module L in the example of FIG. 4, are to be considered or ignored in the generation of the performance reports. Likewise, the user can decide whether to include asynchronously activated modules such as the module Q in FIG. 4.

Figure 5:
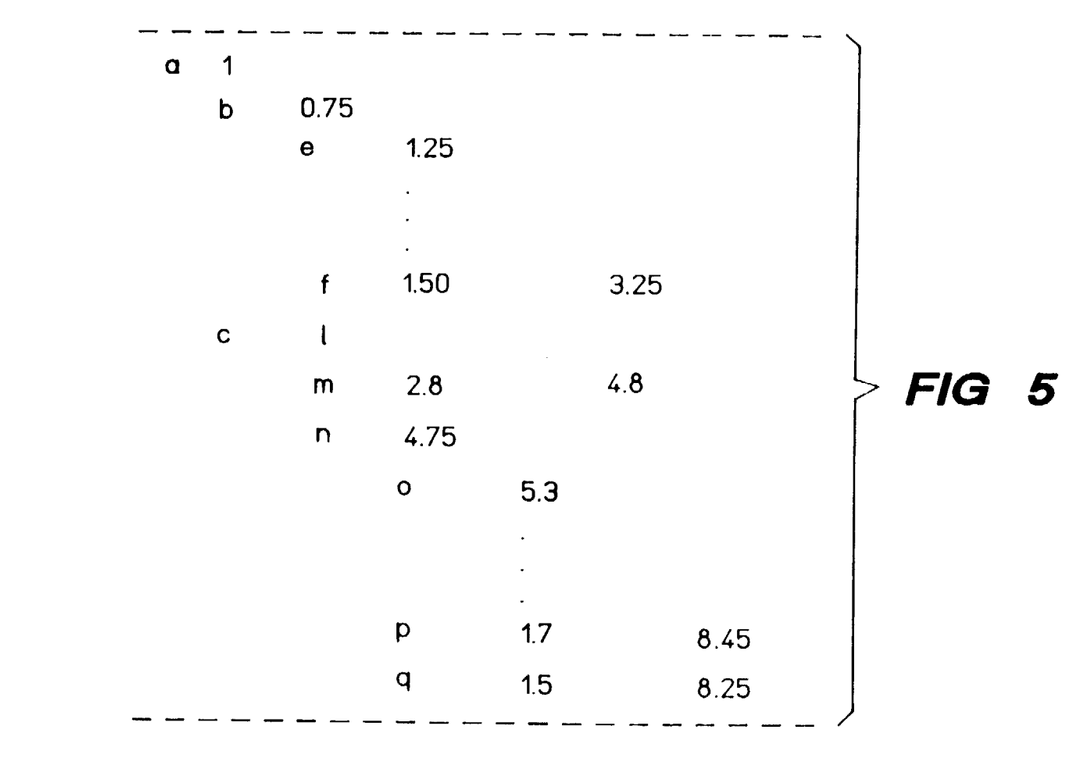
FIG. 5 is an example of a spreadsheet that can be generated by the design evaluation tool.

As a further feature, the design evaluation tool 24 can include a facility which activates a spreadsheet program 30 to use the information contained in the worksheet file 28. An example of such a spreadsheet is illustrated in FIG. 5 for a portion of the program whose structure is depicted in FIG. 4. At the left of this spreadsheet the root module A is identified. Immediately to the right of the module identification, the weight which has been assigned to this module is listed. In this case the weight of the root module is 1. Below the weight are listed the other modules that are called from the root module. In the illustrated example only modules B and C are listed. Again, the weight for each of these modules is shown to the immediate right of the module identification. Below the weight for each of these two modules are listed other modules that can be called from these modules, along with their assigned weights. For each module which is the terminal module in a path, the summed weight for the path to that module is also listed. Thus, the total weights of the paths A/C/M and A/B/F (4.8 and 3.25, respectively) are shown to the extreme right in the example of FIG. 5.

An advantage associated with the presentation of this information in a spreadsheet is that it enables the user to create hypothetical situations from which he can asses the overall performance of the program. Specifically, the user can alter the weights of individual modules within the spreadsheet; when the spreadsheet is recalculated, the user is provided with updated information that shows how the new module weight affects the overall performance of the program. In this regard, the tool 24 can generate a report which lists the original weight of a module, the new weight assigned by the user, and a "delta" or difference between the two weights. This delta can be expressed as a percentage of the original weight. The report can also identify the percentage difference which the weight change will have on the performance timing of each path in which the changed module is located. From this information, the user can determine whether optimization of a particular module, for example to reduce its complexity, is a worthwhile effort. If desired, the user can instruct the evaluation tool 24 to update the software design data base 22 with the revised weights entered into the spreadsheet 30.

Figure 6:
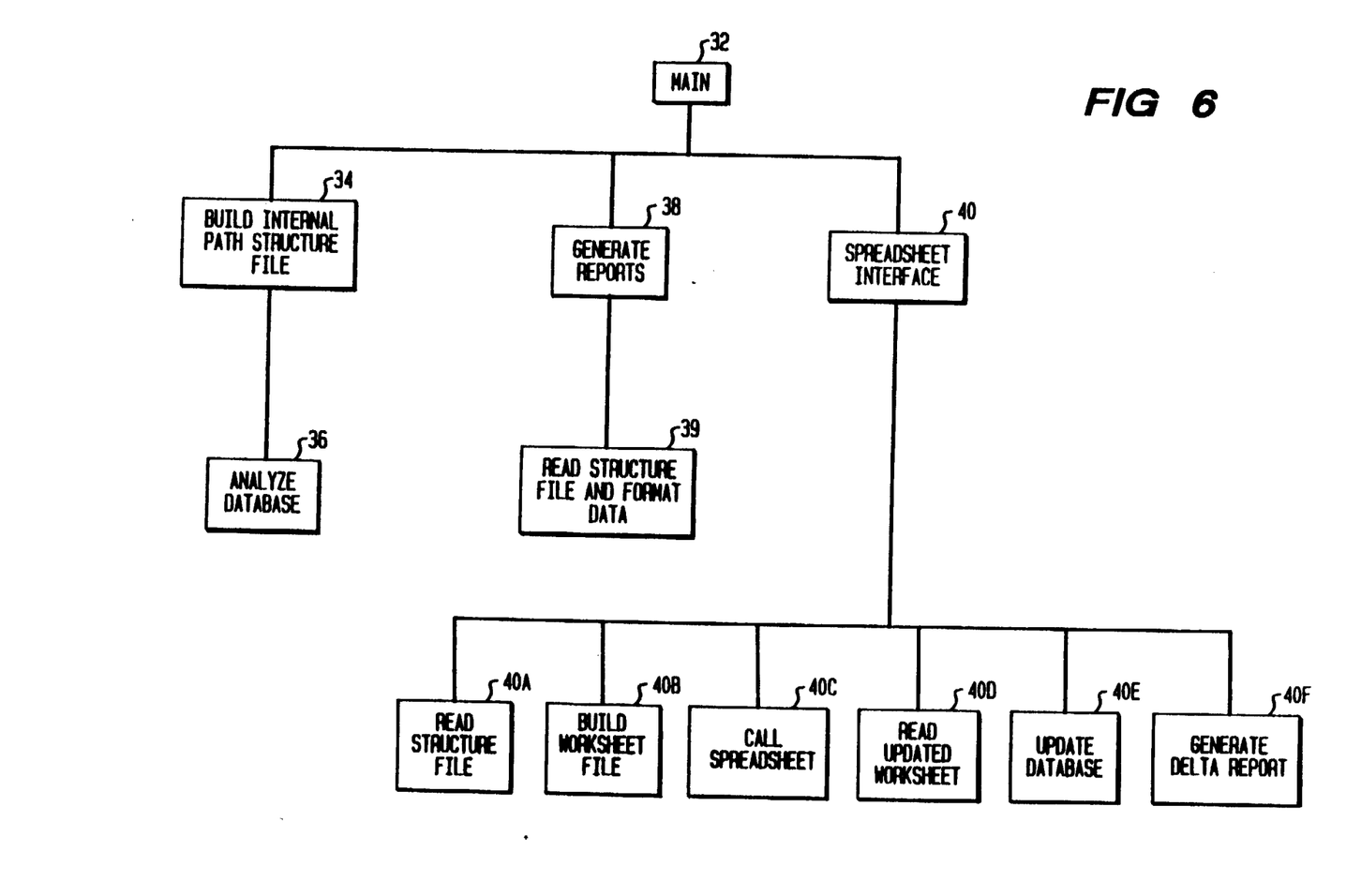
FIG. 6 is a general structure chart depicting the overall operation of the present invention.

A general structure chart for the overall operation of the design evaluation tool 24 is illustrated in FIG. 6. The tool begins operation in a main routine 32 which handles initialization and various other housekeeping chores and controls the overall flow of the program. Once these general operations have been carried out, the program branches to a routine 34 for building an internal path structure file. In this process, the structured design database 22 is analyzed within another routine 36 and a file is built which describes all of the paths, their lengths and weights, and associated loop and condition information. After the internal file has been built, the program branches to a routine 38 to generate reports. As part of this function, the program reads the data stored in the internal file and formats this data to produce the appropriate reports by means of a routine 39.

Therefore, the design evaluation program can branch to the spreadsheet interface routine 40. Within this routine, the appropriate data from the internal file is again read (subroutine 40A) and a worksheet file is built (subroutine 40B). A suitable spreadsheet application program is then called (subroutine 40C) and the spreadsheet is displayed. If the user modifies any of the weight values for the module, the updated information is read (subroutine 40D) and used to update the database 22 (subroutine 40E). The updated data is also used to generate the delta reports (subroutine 40F).

Figure 7:
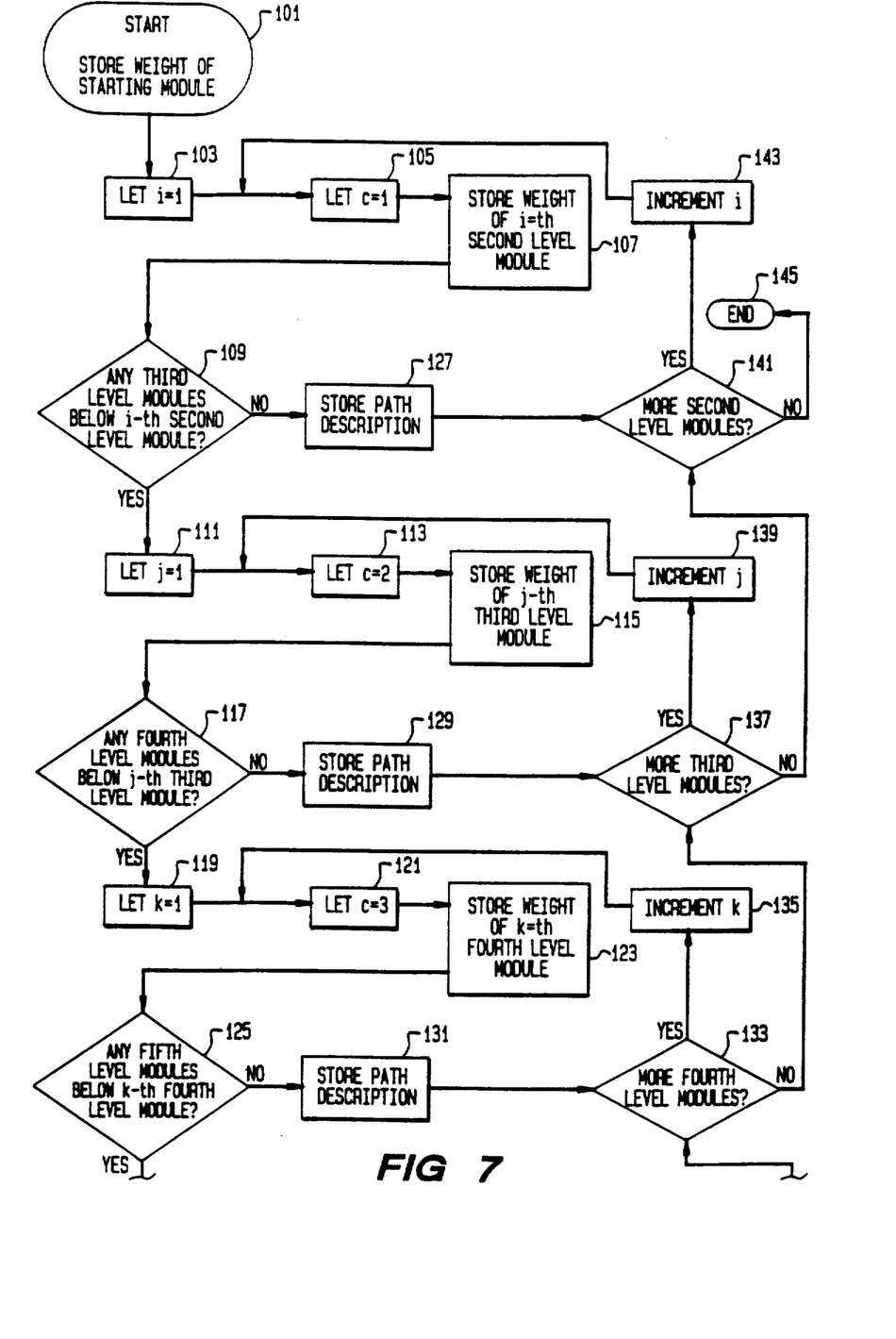
FIG. 7 is a more specific flow chart illustrating the analysis of the information in the Structured Design database to create an internal path structure file.

A more specific flow chart which illustrates the operation of the database analysis routine 36 is shown in FIG. 7. Basically, the evaluation of the design being tested proceeds as a series of nested loops in which each possible path in the structure of the design is identified and its length is measured.

At the outset, the tool begins at a starting module selected by the user. If the user does not select a starting module, the tool starts with the root module (module A in the example of FIG. 4). The weight of the starting module is stored as indicated by a block 101 in FIG. 7. The starting module defines a top or first module level.

A variable "i" is used to identify any second level modules which are called from the starting module. This variable is initially set equal to 1, as indicated by a block 103. A level counter "c" is used to keep track of how many levels there are between the starting module and a terminal module, and this variable is also initially set equal to 1, as indicated by a block 105.

By referring to the module specification stored in the data base 22, the tool 24 finds and stores the weight of the i-th second level module which is called from the root module, as indicated by a block 107. The tool also finds whether any third level modules are called from the i-th second level module, as indicated by a decision block 109. If so, a variable "j" is used to identify such third level modules. This variable is initially set equal to 1, as indicated by a block 111, and the lever counter "c" is set equal to 2 as indicated by a block 113 to show that there are two levels between the starting module and the j-th third level module. Then the weight of the j-th third level module is stored as indicated by a block 115.

Similarly, the tool finds whether any fourth level modules are called from the j-th third level module, as indicated by a decision block 117. A variable "k" is used to identify such fourth level modules and is initially set equal to 1, as indicated by a block 119, and the level counter "c" is set equal to 3 as indicated by a block 121. Then the weight of the k-th fourth level module is stored as indicated by a block 123.

The process continues with any fifth level modules which are called from the k-th fourth level module, as indicated by a decision block 125, and so forth.

Eventually a terminal module (a module which calls no lower-level modules) is reached. When this happens, a description of the path which has been followed from the starting module to that terminal module is stored. For example, if the terminal module is the i-th second level module, this occurs in response to a negative answer from the decision block 109 (whether any third-level modules are called from that second level module) as indicated by a block 127.

Similarly, if the terminal module is the j-th third level module, the path description is stored in response to a negative answer from the decision block 117 as indicated by a block 129, and if the terminal module is the k-th fourth level module the path description is stored in reponse to a negative answer from the decision block 125 as indicated by a block 131.

The path description includes the value of the level counter "c", which indicates the length of the path; the identification and weight of each module in the path; the sum of the weights of the modules; and any applicable loop and conditional information respecting the path.

After storing the path description, the tool returns to the next previous level and continues with all other possible modules that can be accessed from the module which called the terminal module. This procedure continues until all possible paths have been identified and their descriptions stored. For example, if the k-th fourth level module is a terminal module, the tool determines whether there are any other fourth level modules called by the j-th third level module, as indicated by a decision block 133. If so, k is incremented as indicated by a block 135 and the tool returns to block 121.

If there are no more fourth level modules, the tool determines whether any other third level modules are called by the i-th second level module, as indicated by a decision block 137. If so, j is incremented as indicated by a block 139 and the tool returns to block 113. Similarly, if there are no more third level modules, the tool determines whether any other second level modules are called by the starting module, as indicated by a decision block 141. If so, i is incremented as indicated by a block 143 and the tool returns to the block 105. When no more modules are left, the analysis routine 36 ends as indicated by a block 145.

From the foregoing, it will be appreciated that the present invention provides the software engineer with a tool to evaluate the efficiency of a program design, and possible performance drawbacks, early in the development life cycle of the program. By providing the software engineer with this type of information at such an early stage, the need to write program code and test portions of the program that may need to be subsequently redesigned is thereby avoided. Furthermore, by enabling the designer to experiment with different performance weights for each module and measure the effect of these different weights on total performance, designs can be optimized prior to coding.

The tool provided by the present invention will be especially valuable to a software engineer who is designing a large and complex software system. Such a system may have large numbers of levels, many modules at each level, and many hundreds of possible paths among these modules. The structure of many such systems is so complex as to defy any attempt at analysis by existing means. The present invention makes it possible for the engineer to evaluate such a design, find potential trouble spots and correct them, all before any coding has taken place.

Uses for the present invention are not limited to the development of entirely new programs. It can also be used to analyze potential problem areas whenever enhancements are being made to existing software.

It will be appreciated by those of ordinary skill in the art that the present invention can be implemented in other ways and embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. In a computerized software design method that includes, prior to coding a program being designed, the steps of providing a pluralilty of modules for the program being designed, specifying a hierarchical relationship among the modules, and creating a computerized database that includes a description of each of the modules and of the hierarchical relationship, an improvement comprising, before writing the modules in source code, the computer implemented steps of:

(a) receiving into an electronic computer from a designer an identification of one of the modules as a starting point for a task to be performed by the program being designed;

(b) automatically computing in the electronic computer various possible flow paths through the hierarchical relationship that could be followed by the program in executing the task;

(c) automatically storing a description of the flow paths in a memory of the electronic computer;

(d) automatically computing in the electronic computer values indicative of computational efficiency of the flow paths through the hierarchical relationship:

(e) automatically storing the values in the memory of the electronic computer;

(f) automatically retrieving said descriptions of the flow paths and said values indicative of computational efficiency from the memory and providing them to the designer in a report;

(g) receiving into the electronic computer from the designer a change in the design of the program according to the information in the report; and (h) repeating steps (a) through (g) as desired by the designer to assist the designer in reducing any inefficiencies identified through said values indicative of computational efficiency.

2. An improvement as in claim 1 wherein step (d) comprises computing relative weighted predicted performance of each of the flow paths.

3. An improvement as in claim 1 wherein step (f) comprises selecting flow paths that include at least a predetermined number of the modules.

4. An improvement as in claim 1 wherein step (f) comprises selecting flow paths that include any of the modules that could be called by more than a predetermined number of others of the modules.

5. An improvement as in claim 1 wherein step (d) comprises receiving from the designer weighting factors for the modules and summing the weighting factors for those modules in the various flow paths, and step (f) comprises providing the sums of the weighting factors for the various flow paths.

6. An improvement as in claim 5 wherein step (f) comprises automatically building a spreadsheet in the computer and automatically displaying the spreadsheet to the designer and step (g) comprises receiving changed weighting factors.

* * * * *